US010865342B2

(12) United States Patent
Li et al.

(10) Patent No.: US 10,865,342 B2
(45) Date of Patent: Dec. 15, 2020

(54) ENHANCED HIGH TEMPERATURE CROSSLINKED FRACTURING FLUIDS

(71) Applicant: Saudi Arabian Oil Company, Dhahran (SA)

(72) Inventors: Leiming Li, Sugar Land, TX (US); Feng Liang, Cypress, TX (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/114,662

(22) Filed: Aug. 28, 2018

(65) Prior Publication Data
US 2019/0062619 A1    Feb. 28, 2019

Related U.S. Application Data

(60) Provisional application No. 62/551,369, filed on Aug. 29, 2017.

(51) Int. Cl.
*C09K 8/68* (2006.01)
*C09K 8/88* (2006.01)
*C09K 8/86* (2006.01)

(52) U.S. Cl.
CPC ............. *C09K 8/685* (2013.01); *C09K 8/86* (2013.01); *C09K 8/882* (2013.01); *C09K 8/887* (2013.01); *C09K 2208/26* (2013.01)

(58) Field of Classification Search
None
See application file for complete search history.

(56) References Cited

U.S. PATENT DOCUMENTS

| 3,938,594 A | 2/1976 | Rhudy et al. |
| 4,137,182 A | 1/1979 | Golinkin |

(Continued)

FOREIGN PATENT DOCUMENTS

| EP | 0805260 | 11/1997 |
| WO | 2003025340 | 3/2003 |
| WO | 2017096055 | 6/2017 |

OTHER PUBLICATIONS

International Search Report and Written Opinion issued in International Application No. PCT/US2018/048087 dated Nov. 7, 2018, 16 pages.

(Continued)

*Primary Examiner* — John J Figueroa
(74) *Attorney, Agent, or Firm* — Fish & Richardson P.C.

(57) ABSTRACT

A fracturing fluid including a mixture of an aqueous terpolymer composition including a terpolymer, an additive, and crosslinker. The terpolymer includes 2-acrylamido-2-methylpropanesulfonic acid, acrylamide, and acrylic acid monomer units, or a salt thereof. The additive includes a sugar alcohol or a derivative thereof, and the crosslinker includes a metal. The weight ratio of the metal to the terpolymer is in a range of 0.01 to 0.16, and a concentration of the additive is in a range of 0.001 wt. % to 10 wt. % of the fracturing fluid. Treating a subterranean formation includes introducing the fracturing fluid into a subterranean formation, and crosslinking the fracturing fluid in the subterranean formation to yield a crosslinked fracturing fluid. The crosslinked fracturing fluid mitigates damage caused by substantial amounts of total dissolved solids or significant water hardness.

22 Claims, 5 Drawing Sheets

(56) References Cited

U.S. PATENT DOCUMENTS

| | | | |
|---|---|---|---|
| 5,007,481 A | 4/1991 | Williams et al. | |
| 6,613,720 B1* | 9/2003 | Feraud | C09K 8/62 |
| | | | 166/300 |
| 6,986,391 B2 | 1/2006 | Funkhouser et al. | |
| 8,309,498 B2 | 11/2012 | Funkhouser et al. | |
| 8,450,252 B2 | 5/2013 | Funkhouser et al. | |
| 10,442,980 B2* | 10/2019 | Li | C09K 8/588 |
| 2005/0039919 A1* | 2/2005 | Harris | C09K 8/68 |
| | | | 166/308.1 |
| 2008/0103068 A1* | 5/2008 | Parris | C09K 8/685 |
| | | | 507/261 |
| 2010/0048430 A1 | 2/2010 | Funkhouser et al. | |
| 2012/0006551 A1 | 1/2012 | Carman et al. | |
| 2013/0118740 A1 | 5/2013 | Sherman et al. | |
| 2015/0072902 A1 | 3/2015 | Lafitte et al. | |
| 2016/0060504 A1 | 3/2016 | Dawson et al. | |
| 2016/0319187 A1 | 11/2016 | Lawrence et al. | |
| 2017/0198207 A1 | 7/2017 | Li et al. | |

OTHER PUBLICATIONS

Funkhouser and Norman, "Synthetic Polymer Fracturing Fluid for High-Temperature Application," SPE 80236, Society of Petroleum Engineers, International Symposium on Oilfield Chemistry, Feb. 5-7, 2003, 6 pages.

Gaillard et al., "Novel Associative Acrylamide-based Polymers for Proppant Transport in Hydraulic Fracturing Fluids," SPE 164072, Society of Petroleum Engineers, SPE International Symposium on Oilfield Chemistry, Apr. 8-10, 2013, 11 pages.

Gupta and Carman, "Fracturing Fluid for Extreme Temperature Conditions is Just as Easy as the Rest," SPE 140176, Society of Petroleum Engineers, SPE Hydraulic Fracturing Technology Conference, Jan. 24-26, 2011, 5 pages.

Gulf Cooperation Council Examination Report issued in GCC Application No. GC 2018-35923 dated Jun. 21, 2020, 3 pages.

\* cited by examiner

ENHANCED HIGH TEMPERATURE CROSSLINKED FRACTURING FLUIDS

CROSS-REFERENCE TO RELATED APPLICATIONS

This application claims the benefit of priority to U.S. Provisional Application Ser. No. 62/551,369, filed on Aug. 29, 2017, the contents of which are hereby incorporated by reference.

TECHNICAL FIELD

This document relates to methods and compositions used in hydraulic fracturing operations, particularly those compatible with high temperatures of about 280° F. up to about 450° F., for use with hard water or water with high total dissolved solids (TDS).

BACKGROUND

Polysaccharide-based fluids such as guar fluids are commonly used in hydraulic fracturing operations, primarily because of their abundance and capability to work at temperatures up to 350° F. when formulated at alkaline pH (for example, greater than 9.5). One notable disadvantage, however, for most guar-based fracturing fluids is the insoluble residue in guar which tends to cause permeability reduction. Another disadvantage for using guar-based fluids at alkaline pH is the tendency for forming divalent ion scales. In general, thermally stable synthetic polymers, such as acrylamide based polymers are considered to be residue-free. These polymers can be used for preparing fracturing fluids around 300-450° F. However, acrylamide based polymers may still cause formation damage due to factors such as incomplete degradation. In addition, when the total dissolved solids (TDS) or water hardness exceeds certain levels, performance of the fracturing fluid can be adversely affected.

SUMMARY

In a first general aspect, a fracturing fluid includes a mixture of an aqueous terpolymer composition, a crosslinker, and an additive including at least one of a sugar alcohol and a sugar alcohol derivative. The aqueous terpolymer composition includes a terpolymer having 2-acrylamido-2-methylpropanesulfonic acid, acrylamide, and acrylic acid monomer units. The acrylic acid monomer units may be in the form of a salt of acrylic acid. The crosslinker includes a metal. In some cases, the crosslinker is presented in a water miscible non-aqueous solvent. A weight ratio of the metal to the terpolymer is in a range of 0.01 to 0.16, and a concentration of the additive is in a range of 0.001 weight percent (wt. %) to 10 wt. % of the fracturing fluid.

A second general aspect includes the fracturing fluid of the first general aspect, with the terpolymer comprising 1 mol % to 55 mol % of the 2-acrylamido-2-methylpropanesulfonic acid monomer units, and the crosslinker present in an amount sufficient to yield a crosslinked fluid having a viscosity of at least 500 centiPoise (cP) at a temperature of 300° F. and a pH less than 7.

In a third general aspect, treating a subterranean formation includes introducing the fracturing fluid of the first general aspect into the subterranean formation, and further includes crosslinking the fracturing fluid in the subterranean formation to yield a crosslinked fracturing fluid.

Implementations of the first, second, and third general aspects may include one or more of the following features.

In some embodiments, the additive includes a sugar alcohol. The sugar alcohol may include at least one of sorbitol, erythritol, mannitol, lactitol, xylitol, and maltitol. A concentration of the sugar alcohol is typically in a range of 0.005 wt. % to 10 wt. % of the fracturing fluid.

In some embodiments, the additive includes a sugar alcohol derivative. The sugar alcohol derivative may include at least one of a derivative of sorbitol, erythritol, mannitol, lactitol, xylitol, and maltitol. A concentration of the sugar alcohol derivative may be in a range of 0.01 wt. % to 10 wt. %, 0.05 wt. % to 5 wt. %, or 0.05 wt. % to 2 wt. % of the fracturing fluid. In certain embodiments, the sugar alcohol derivative includes an alkylated sugar alcohol.

In some embodiments, the weight ratio of the metal to the terpolymer is in a range of 0.02 to 0.06.

In some embodiments, the terpolymer includes 1 mole percent (mol %) to 55 mol %, 1 mol % to 40 mol %, or 1 mol % to 25 mol % of the 2-acrylamido-2-methylpropanesulfonic acid monomer units.

In some embodiments, the fracturing fluid includes at least one of a gel stabilizer, a clay stabilizer, a viscosity breaker, a proppant, and a pH adjusting agent. In one embodiment, the fracturing fluid includes a pH adjusting agent, and a pH of the fracturing fluid is in a range of 2 to 7 or 3 to 6.5. In some cases, the carrier fluid in the fracturing fluid may have between 50 milligrams per liter (mg/L) and 50,000 mg/L of total dissolved solids. In certain cases, a concentration of the zirconium metal in the fracturing fluid is in a range of 0.001 wt. % to 0.048 wt. % of the fracturing fluid. The fracturing fluid typically includes 20 to 50 pounds of the terpolymer per thousand gallons of the fracturing fluid.

In some embodiments, after crosslinking, the fracturing fluid has a viscosity of at least 500 cP for at least 80 minutes when the gel is subjected to a shear rate of 40 seconds$^{-1}$ ($s^{-1}$) at a temperature in a range of 300° F. to 400° F. In some embodiments, the crosslinker includes a water-miscible, non-aqueous fluid. In some embodiments, the crosslinker includes zirconium, the fracturing fluid includes 25 pounds of the terpolymer per thousand gallons of the fracturing fluid, a weight ratio of the zirconium to the terpolymer is in a range of about 0.02 to about 0.04, the terpolymer includes 15 wt. % of the 2-acrylamido-2-methylpropane-sulfonic acid monomer units, and the crosslinked fracturing fluid maintains a viscosity of at least 500 cP for up to 180 minutes when the crosslinked fracturing fluid is subjected to a shear rate of 40 $s^{-1}$ at a temperature of 300° F. In certain embodiments, the crosslinked fracturing fluid includes a viscosity breaker and maintains a viscosity of at least 500 cP for up to 160 minutes and has a viscosity of less than 10 cP after 360 minutes when the crosslinked fracturing fluid is subjected to a shear rate of 40 $s^{-1}$ at a temperature of 300° F.

In some embodiments, the crosslinker includes zirconium, the fracturing fluid includes 20 pounds of the terpolymer per thousand gallons of the fracturing fluid, a weight ratio of the zirconium to the terpolymer is in a range of about 0.02 to about 0.04, and the crosslinked fracturing fluid maintains a viscosity of at least 500 cP for up to 180 minutes when the crosslinked fracturing fluid is subjected to a shear rate of 40 $s^{-1}$ at a temperature of 300° F.

In some embodiments, the crosslinker includes zirconium, the fracturing fluid includes 30 pounds of the terpolymer per thousand gallons of the fracturing fluid, a weight ratio of the zirconium to the terpolymer is in a range of about 0.02 to about 0.04, and the crosslinked fracturing fluid maintains a viscosity of at least 500 cP for up to 80 minutes when the crosslinked fracturing fluid is subjected to a shear rate of 40 s$^{-1}$ at a temperature of 400° F.

Advantages of the first, second, and third general aspects include a lesser level of 2-acryl-amido-2-methylpropanesulfonic acid monomer units in the terpolymer, lesser terpolymer loadings in the fracturing fluids, lesser crosslinker to terpolymer ratios, and rapid viscosity reduction via viscosity breakers in the presence of the crosslinked fracturing fluids, as compared to previously disclosed fracturing fluids. In addition, the additive helps mitigate damage that can be caused by significant amount TDS or substantial water hardness of the fracturing fluid.

DETAILED DESCRIPTION

Provided in this document are fracturing fluids and crosslinked fracturing fluids including an additive. The fracturing fluids include an aqueous composition including a polymer and a crosslinking solution including a crosslinker. The additive includes a sugar alcohol, a sugar alcohol derivative, or both. The crosslinked fracturing fluids include a crosslinked product of the polymer and the crosslinker. The additive enhances the high-temperature (for example, greater than 250° F.) stability of crosslinked fracturing fluids formed with hard water containing elevated levels of total dissolved solids (TDS) compared to soft water. TDS generally refers to inorganic salts, such those including calcium ($Ca^{2+}$), magnesium ($Mg^{2+}$), potassium ($K^+$), sodium ($Na^+$), bicarbonates ($HCO_3^-$), chlorides ($Cl^-$), and sulfates ($SO_4^{2-}$), and can include a small amount of dissolved organic matter. "Water hardness" is generally understood to refer to the amount of dissolved calcium and magnesium, and "total hardness" is typically reported as parts per million (ppm) of calcium carbonate (by weight). In one example, a water supply with a hardness of 100 ppm contains the equivalent of 100 g of calcium carbonate in 1 million grams of water, or 0.1 gram (g) in 1 liter (L) (or 1000 g of water, since the density of water is about 1 gram per milliliter (g/mL)). Total hardness in milligrams per liter (mg/L) as calcium carbonate can be calculated as 2.5 $[Ca^{2+}]$+4.1 $[Mg^{2+}]$, where $[Ca^{2+}]$ is the calcium ion concentration in mg/L, and $[Mg^{2+}]$ is the magnesium ion concentration in mg/L. The United States Geological Survey (USGS) considers a water sample "hard" when the water hardness is 121-180 mg/L. Without the additive, the water TDS and hardness may adversely affect the stability of the fracturing fluids at elevated temperatures, such as formation temperature.

In some embodiments, the additive includes a sugar alcohol or a mixture of sugar alcohols. Examples of suitable sugar alcohols include sorbitol, erythritol, mannitol, lactitol, xylitol, and maltitol. A concentration of the sugar alcohol is typically in a range of 0.005 wt. % to 10 wt. % of the fracturing fluid.

In some embodiments, the additive includes a sugar alcohol derivative or a mixture of sugar alcohol derivatives. Examples of suitable sugar alcohol derivatives include derivatives of sorbitol, erythritol, mannitol, lactitol, xylitol, and maltitol. Examples of suitable derivatives include alkylated derivatives, such as ETHOX 3571 (an alkylated sorbitol derivative available from Ethox Chemicals, LLC). A concentration of the sugar alcohol derivative is in a range of 0.01 wt. % to 10 wt. %, 0.05 wt. % to 5 wt. %, or 0.05 wt. % to 2 wt. % of the fracturing fluid. In some cases, the polymer is a copolymer and includes two monomer units: 2-acrylamido-2-methylpropanesulfonic acid (AMPSA) and acrylamide, or a related salt thereof. In other cases, the polymer is a copolymer and includes two monomer units: 2-acrylamido-2-methylpropanesulfonic acid (AMPSA) and acrylic acid, or a related salt thereof. In still other cases, the polymer is a copolymer and includes two monomer units: acrylamide and acrylic acid, or a related salt thereof.

In some cases, the polymer is a terpolymer and includes three monomer units: 2-acrylamido-2-methylpropanesulfonic acid (AMPSA), acrylamide, and acrylic acid or a related salt thereof. The copolymer could contain hydrophobic monomer unit as well. The terpolymer typically has less than 55 mol % of AMPSA. In some cases, the terpolymer has less than 20 mol % AMPSA. In some cases, the terpolymer has between 1 mol % and 55 mol %, between 1 mol % and 40 mol %, between 1 mol % and 25 mol %, between 10 mol % and 30 mol %, between 12 mol % and 20 mol %, or between 13 mol % and 17 mol % AMPSA. In some cases, the terpolymer has about 1 mol %, 5 mol %, 10 mol %, 20 mol %, 25 mol %, 30 mol %, 35 mol %, 40 mol %, 45 mol %, 50 mol %, or 55 mol % AMPSA. The terpolymer can also have about 15 mol % of the AMPSA. The terpolymer can have about 0.1 mol % to about 30 mol % of acrylic acid. The terpolymer has less than 55 mol % AMPSA. In some cases, the terpolymer has less than 20 mol % AMPSA. In some cases, the terpolymer has between 5 mol % and 40 mol %, between 10 mol % and 30 mol %, between 12 mol % and 20 mol %, or between 13 mol % and 17 mol % AMPSA. In some cases, the terpolymer has about 5 mol %, 10 mol %, 20%, 25 mol %, 30 mol %, 35 mol %, 40 mol %, 45 mol %, 50 mol %, or 55 mol % AMPSA. The terpolymer can also have about 15 mol % AMPSA. The terpolymer can have about 0.1 mol % to about 30 mol % of acrylic acid. In an embodiment, the amount of acrylic acid is greater than 0 mol %.

The terpolymers described in this application can be combined with crosslinkers to produce crosslinked fluids that function as efficient proppant transportation fluids at lesser polymer loadings. For example, it has been discovered that a fracturing fluid having a terpolymer concentration of less than 30 pounds per thousand gallons (pptg) can produce crosslinked fluids when combined with a crosslinker, even at a lesser crosslinker/terpolymer ratio for use at about 450° F. In some cases, a fracturing fluid has a terpolymer in a concentration of less than 50 pptg, less than 35 pptg, less than 30 pptg, less than 25 pptg, or less than 20 pptg. In some cases, a fracturing fluid includes a terpolymer in a concentration between 10 and 40 pptg, between 15 and 35 pptg, or between 20 and 30 pptg. In some cases, a fracturing fluid includes a terpolymer in a concentration of about 10 pptg, 15 pptg, 20 pptg, 25 pptg, 30 pptg, 35 pptg, 40 pptg, 45 pptg, or 50 pptg. For example, for a 400° F. application, a fracturing fluid including a terpolymer at a concentration of about 30 pptg, can be used. For example, for a 300° F. application, a fracturing fluid including a terpolymer at a concentration of about 20 pptg can be used.

A terpolymer of AMPSA, acrylamide, and acrylic acid or a related salt thereof may be obtained by polymerizing AMPSA, acrylic acid and acrylamide in specified amounts. The terpolymer can also be produced by initially polymerizing AMPSA and acrylamide, and hydrolyzing the acrylamide to generate desired amounts of acrylic acid, such that the number of moles of acrylamide and acrylic acid monomer units is equal to total number of moles of acrylamide initially employed. The terpolymer can be employed as water-in-oil emulsion or suspension concentrate, or as a solid dissolved in an aqueous fluid.

Fracturing fluids described in this application can include lesser ratios of crosslinker to terpolymer as compared to previously described crosslinked fracturing fluids. Suitable crosslinkers typically include a metal. In some cases, the crosslinker includes zirconium. Suitable zirconium crosslinkers include by non-limiting example, zirconium complexes in which zirconium is complexed with ligands such as lactate salts (for example, sodium zirconium lactate), triethanolamines, alkoxides (for example, isopropoxide and propoxide), 2,2'-iminodiethanol, and mixtures of these ligands. The crosslinker may be suitably dissolved in aqueous fluids or non-aqueous fluids (for example, alcohol such as n-propanol). The crosslinker may also be suitably dissolved in a combination of an aqueous fluid and a water-miscible non-aqueous solvent (for example, alcohol or aminoalcohol). TYZOR® 212, available from Dorf Ketal as a solution in n-propanol, is one example of a Zr crosslinker. When 20 pptg to 30 pptg of the terpolymer is present in the fracturing fluid and the crosslinking solution is TYZOR® 212, a weight ratio of Zr to copolymerterpolymer may be in a range of about 0.01 to about 0.08 (such as about 0.02 to about 0.06 or about 0.02 to about 0.04), and a weight percentage of Zr in the fracturing fluid may be in a range of about 0.001 wt. % to about 0.024 wt. %. Crosslinkers suitable for fracturing fluid may also include titanium (Ti) crosslinkers. Suitable titanate crosslinkers include, by non-limiting example, titanate crosslinkers with ligands such as lactates and triethanolamines, and mixtures thereof. Fracturing fluid may also contain an agent that delays a crosslinking reaction. An example of a crosslinking delaying agent is hydroxyacetic acid. Crosslinkers suitable for fracturing fluid may also include aluminum (Al) crosslinkers, chromium (Cr) crosslinkers, iron (Fe) crosslinkers, hafnium (Hf) crosslinkers, and combinations thereof. In some cases, a crosslinking solution including about 7 wt. % to about 20 wt. % of a metal crosslinker can be present at a concentration of about 0.1 gallons per thousand (gpt) to about 5.0 gpt, about 0.5 gpt to about 1.5 gpt, or about 0.9 gpt to about 1.1 gpt of the fracturing fluid.

Fracturing fluids described in this application have a similar or better gel thermal stability as compared to (1) other fracturing fluids including a polymer having a greater mol % of AMPSA in the polymer and having greater polymer loadings in the fluid; and (2) other fracturing fluids including a polymer having a greater mol % of AMPSA in the polymer or having greater polymer loadings in the fluid. In some cases, fracturing fluids prepared with hard formation water (containing substantial amount of TDS) having 1 gpt additive and a 37.5 pptg terpolymer loading maintain a viscosity of at least 240 cP for about 110 minutes when subjected to a 100 $s^{-1}$ shear rate at a temperature of 280° F. In some cases, fracturing fluids prepared with hard formation water (containing substantial amount of TDS) having 1 gpt additive and a 25 pptg terpolymer loading maintain a viscosity of at least 100 cP for about 37 minutes when subjected to a 100 $s^{-1}$ shear rate at a temperature of 280° F. In some cases, fracturing fluids prepared with high TDS and high hardness formation water having 0.5 gpt additive and a 30 pptg terpolymer loading maintain a viscosity of at least 100 cP for about 120 minutes when subjected to a 100 $s^{-1}$ shear rate at a temperature of 300° F. Compared to fracturing fluids prepared without the sugar alcohol or sugar alcohol derivative, these fracturing fluids maintain a greater viscosity for an extended period of time.

Fracturing fluids of this application can be used at high temperatures between about 300° F. and about 450° F., and typically have a pH in a range of 5 to 7 or 5.5 to 6.5. Additionally, a greater crosslinker concentration is not required, thereby further increasing efficiency associated with the fracturing fluid.

In some cases, fracturing fluids of the present application are formed by mixing a polymer (for example, a terpolymer) with an aqueous carrier. The aqueous carrier can include water, fresh water, brine, produced water, flowback water, brackish water, sea water, or combinations thereof. In some cases, the aqueous carrier has less than 50,000 mg/L of total dissolved solids (TDS). In some cases, the aqueous carrier has between 500 and 20,000 mg/L TDS, between 700 and 10,000 mg/L TDS, between 800 and 2000 mg/L TDS, or between 1,000 and 1,500 mg/L TDS. In some cases, the aqueous carrier has about 500 mg/L TDS, 600 mg/L TDS, 700 mg/L TDS, 800 mg/L TDS, 900 mg/L TDS, 1,000 mg/L TDS, 1,200 mg/L TDS, 1,400 mg/L TDS, 2,000 mg/L TDS, 5,000 mg/L TDS, 10,000 mg/L TDS, 20,000 mg/L TDS, or about 50,000 mg/L TDS. In some cases, the fracturing fluid includes at least one of a gel stabilizer, clay stabilizer, or other suitable additive that may stabilize the gel formation. In some cases, the gel stabilizer includes an antioxidant. In some cases, the gel stabilizer includes phenols, polyphenols, di-tertbutyl alkyl phenols, hydroquinone, apigenin, resveratrol, ascorbic acid, tocopherol, sodium bisulfite, sodium hydrogen sulfite, sodium thiosulfate, ammonium thiosulfate, thiourea, or a combination thereof. In some cases, the clay stabilizer includes sodium chloride, potassium chloride, ammonia chloride, tetramethylammonium chloride (TMAC), other quaternary molecules, or a combination thereof. In some cases, bromides, such as sodium bromide or potassium bromide, is included.

In some cases, the fracturing fluid includes a pH adjusting agent. For example, the fracturing fluid can include an acetic acid solution, an acetic acid/acetate buffer solution, or hydrochloric acid. In some cases, an acid is added to a fracturing fluid to achieve a pH between about 2 and 7, 3 and 6.5, and 5 and 5.5, or between about 5 and 7 or 5.5 and 6.5.

In some cases, a fracturing fluid includes a proppant. Examples of proppants include sand, gravel, glass beads, polymer beads, ground products from shells and seeds (such as walnut hulls), and manmade materials (such as ceramic proppant, bauxite, tetrafluoroethylene materials), fruit pit materials, processed wood, composite particulates prepared from a binder, and fine grade particulates such as silica, alumina, fumed silica, carbon black, graphite, mica, titanium dioxide, meta-silicate, calcium silicate, kaolin, talc, zirconia, boron, fly ash, hollow glass microspheres, solid glass, or a combination thereof.

EXAMPLES

Chemicals

M1—The terpolymer used in the examples to be presented is in a water-in-oil emulsion form (30% active) containing 15 mol % of 2-acrylamido-2-methylpropanesulfonic acid (AMPSA), 5 mol % of acrylic acid (AA), and 80 mol % acrylamide (AM).

M2—20% acetic acid solution; M2'—acetic acid/acetate buffer solution.

M3—Zr crosslinker (TYZOR® 212, with 16.75 wt % $ZrO_2$ and 12.4 wt % Zr).

M4—gel stabilizer (CELB 225-010-2, available from ChemEOR).

M5—clay stabilizer, 50% tetramethylammonium chloride (TMAC) (PACS-150L available from Precision Additives).

In Examples 1-3, fracturing fluids with M1 terpolymer, and Zr crosslinker (M3), and synthetic field water (TDS of about 1200 mg/L, total hardness of about 6 mg/L) were prepared without a sugar alcohol or sugar alcohol derivative.

Example 1

Figure 1:
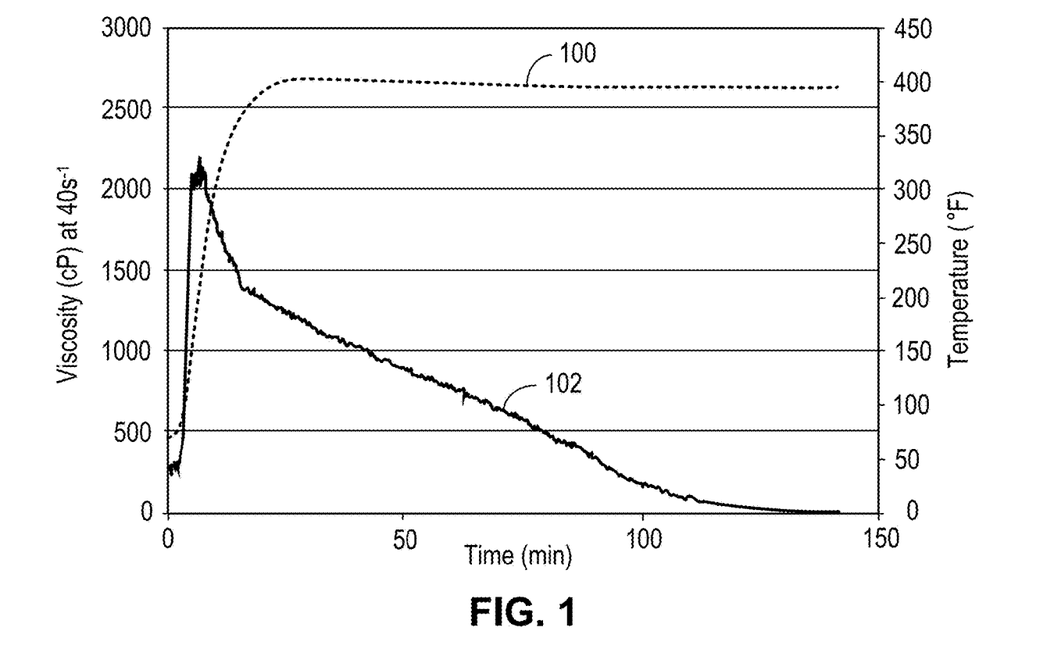
FIG. 1 shows a plot of viscosity versus time for an embodiment of a crosslinked fracturing fluid.

A fracturing fluid including synthetic field water (TDS of about 1200 mg/L), 30 pptg terpolymer (M1), 1.9 gpt 20% acetic acid solution (M2), 4 gpt gel stabilizer (M4), 2 gpt clay stabilizer (M5, 50% TMAC), and 0.8 gpt of Zr crosslinker (M3, with 12.4 wt. % Zr) was prepared. The pH of the mixed fluid was 5.4. The weight ratio of Zr to terpolymer M1 was about 0.03. Viscosity of the resulting crosslinked fracturing fluid at a shear rate of 40 $s^{-1}$ was measured at 400° F. Plot 100 in FIG. 1 shows temperature versus time, and plot 102 shows viscosity versus time for the crosslinked fracturing fluid. The fracturing fluid maintained a viscosity of greater than 500 cP at a shear rate of 40 $s^{-1}$ for 87 min.

Example 2

Figure 2:
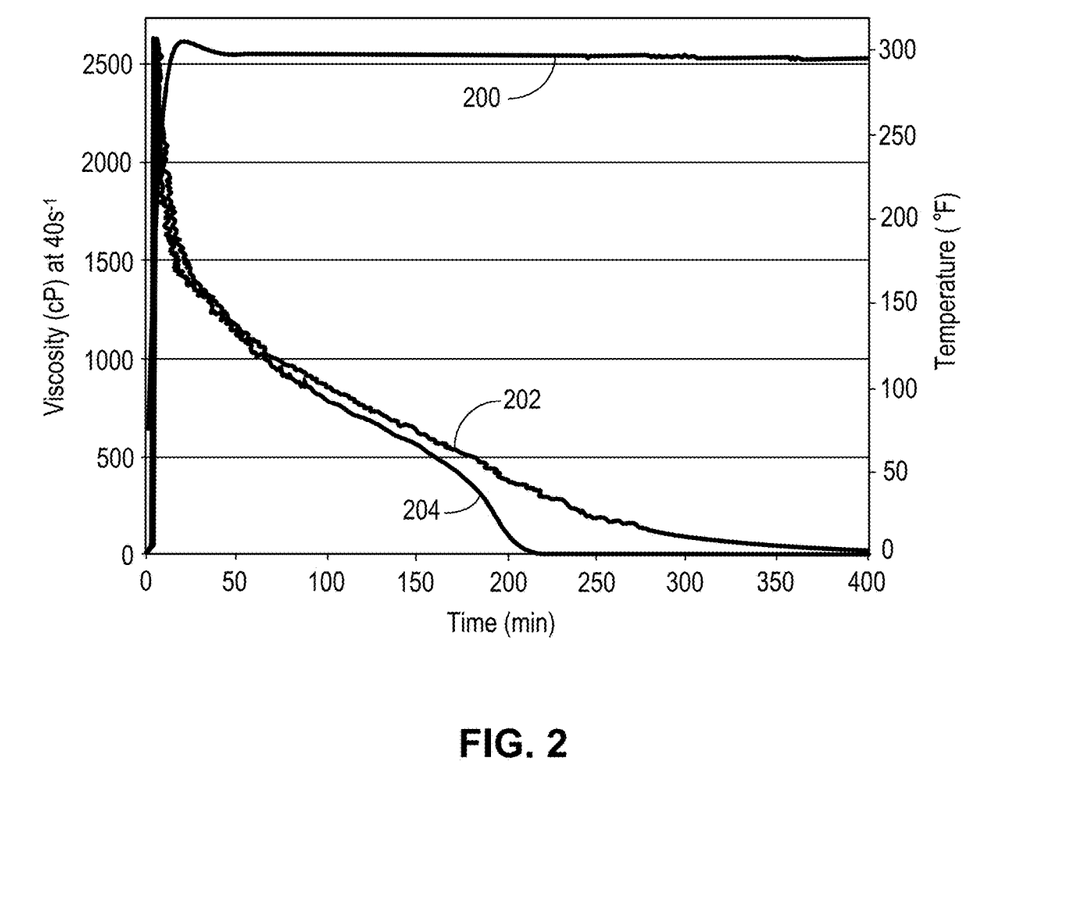
FIG. 2 shows a plot of viscosity versus time for an embodiment of a crosslinked fracturing fluid with and without a viscosity breaker.

A fracturing fluid including synthetic field water (TDS of about 1200 mg/L), 25 pptg terpolymer (M1), 3.5 gpt 20% acetic acid/acetate buffer solution (M2'), 0.5 gpt gel stabilizer (M4), 2 gpt clay stabilizer (M5), and 0.5 gpt of Zr crosslinker M3 (with 12.4 wt. % Zr) was prepared. The pH of the mixed fluid was 5.4. The weight ratio of Zr to terpolymer M1 was about 0.02. Viscosity of the resulting crosslinked fracturing fluid at a shear rate of 40 $s^{-1}$ was measured at 300° F. Plot 200 in FIG. 2 shows temperature versus time. Plot 202 shows viscosity versus time for the crosslinked fracturing fluid in the absence of a viscosity breaker. Plot 204 shows viscosity versus time for the crosslinked fracturing fluid with 4 pptg encapsulated sodium bromate (for example, about 70 wt. % sodium bromate, the balance coating) as a viscosity breaker. The crosslinked fracturing fluid with viscosity breaker maintained a viscosity of over 500 cP at a shear rate of 40 $s^{-1}$ for a duration of 160 min. After 6 hours, the viscosity of the crosslinked fracturing fluid broken with sodium bromate was less than 10 cP, indicating that encapsulated sodium bromate is capable of breaking the fracturing fluid containing terpolymer and Zr crosslinker. Additionally, it was found that the crosslinked fracturing fluid is capable of suspending proppant, and that the broken fluid does not contain gel residue.

Example 3

Figure 3:
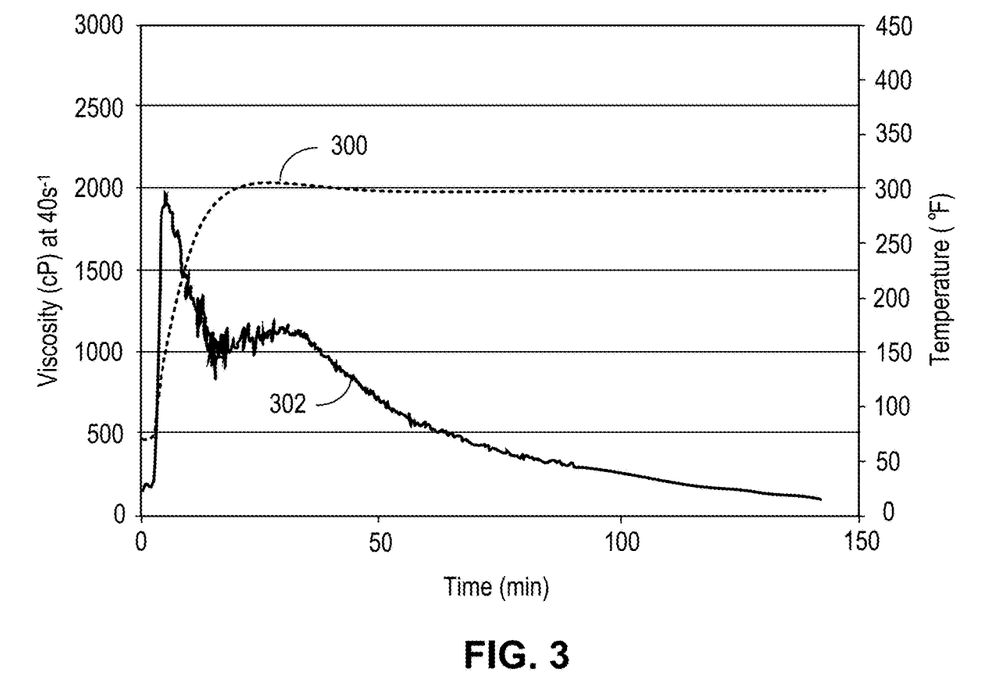
FIG. 3 shows a plot of viscosity versus time for an embodiment of a crosslinked fracturing fluid.

A fracturing fluid including synthetic field water (TDS of about 1200 mg/L), 20 pptg terpolymer (M1), 3 gpt 20% acetic acid/acetate buffer solution (M2'), 1 gpt gel stabilizer (M4), 2 gpt clay stabilizer (M5), 0.5 gpt Zr crosslinker (M3, with 12.4 wt % Zr) was prepared. The pH of the composition was 5.6. The weight ratio of Zr to terpolymer M1 was about 0.028. Viscosity of the resulting crosslinked fracturing fluid at a shear rate of 40 $s^{-1}$ was measured at 300° F. Plot 300 in FIG. 3 shows temperature versus time. Plot 302 shows viscosity versus time for the crosslinked fracturing fluid. The fracturing fluid maintained a viscosity of over 500 cP at a shear rate of 40 $s^{-1}$ for 70 min.

These results indicate that a crosslinked fracturing fluid containing soft water with lesser TDS and having a terpolymer with acrylamide, acrylic acid, and less than 15 mol % AMPSA can be employed at lesser terpolymer concentration (for example, 20 to 30 pptg) at temperatures from about 300° F. to about 400° F. The results from rheological studies demonstrate superior crosslinking performance and thermal stability of fracturing fluids with lesser terpolymer loading in this temperature range. These fracturing fluids have sufficient proppant carrying viscosity, allow for efficient cleanup using an oxidizer type breaker, and facilitate efficient cleanup, reduced formation damage, better fluid conductivity, and enhanced production rates.

Figure 4:
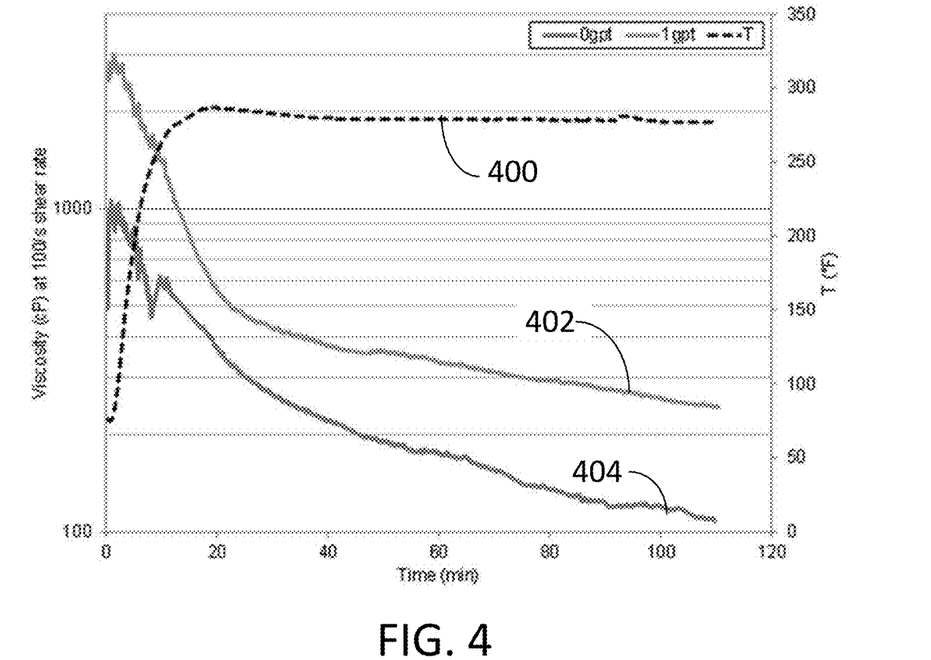
FIG. 4 shows plots of viscosity versus time for a crosslinked fracturing fluid with and without a sorbitol derivative additive.
Figure 5:
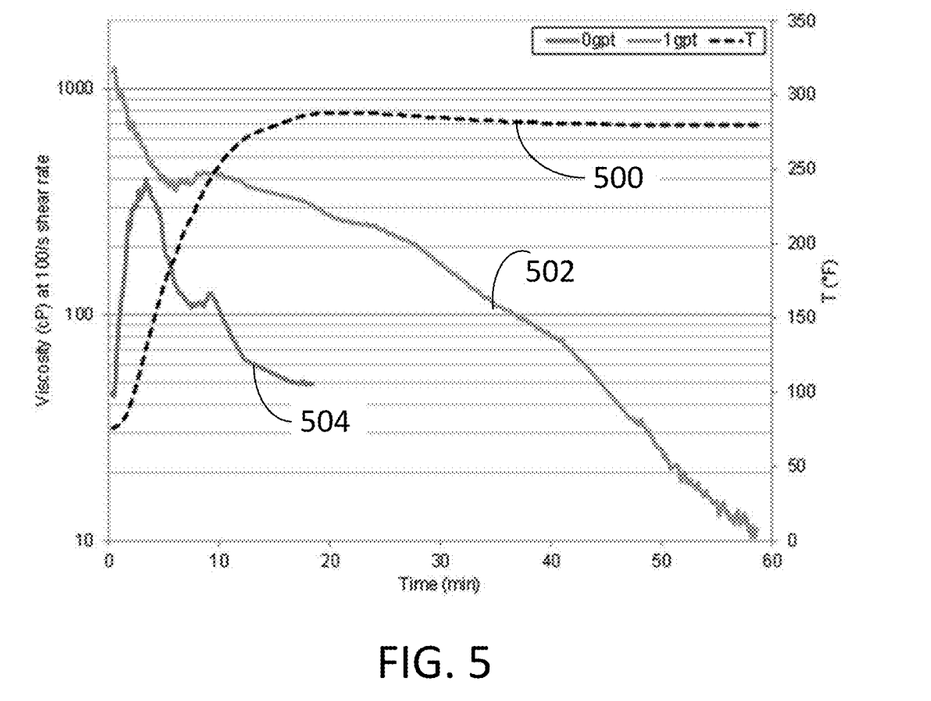
FIG. 5 shows plots of viscosity versus time for a crosslinked fracturing fluid with and without a sorbitol derivative additive.
Figure 6:
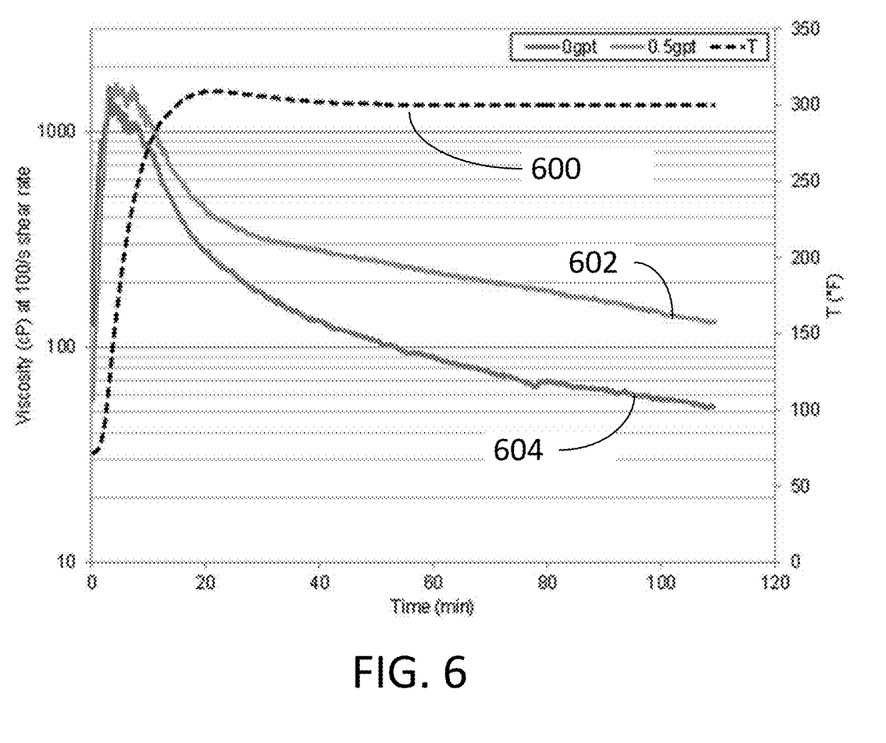
FIG. 6 shows plots of viscosity versus time for a crosslinked fracturing fluid with and without a sorbitol derivative additive.

In Examples 4-6, fracturing fluids with M1 terpolymer, Zr crosslinker, and formation water (hard water with substantial amount of TDS) were prepared with and without ETHOX 3571. Viscosity was measured as a function of time for fracturing fluids with ETHOX 3571 (Samples 4-6) and fracturing fluids without ETHOX 3571 (Comparative Samples 4-6). As shown in FIGS. 4-6, the ETHOX 3571 enhanced the performance of the fracturing fluid system containing hard water with substantial amount of TDS at elevated temperatures.

Example 4

A fracturing fluid including formation water (TDS of about 5600 mg/L, hardness of about 3200 mg/L), 37.5 pptg of M1 terpolymer (DP/EM 5015), and Zr crosslinker (M3) was prepared. Table 1 lists components of the formation water. In Sample 4, 1 gpt of ETHOX 3571 (about 0.1 wt. %) was added to the formation water. In Comparative Sample 4, no ETHOX 3571 was added. Viscosity of the resulting crosslinked fracturing fluids at a shear rate of 100 $s^{-1}$ was measured at 280° F. Plot 400 in FIG. 4 shows temperature versus time. Plot 402 shows viscosity versus time for Sample 4. Plot 404 shows viscosity versus time for Comparative Sample 4. For Sample 4 and Comparative Sample 4, the fluid viscosity stayed greater than about 240 cP for about 110 minutes and about 30 minutes, respectively, indicating greater increased temperature stability for Sample 4 (containing ETHOX 3571).

TABLE 1

| Components of the formation water from Example 4 | |
|---|---|
| Component | Concentration (mg/L) |
| Calcium | 574 |
| Iron | 0.3 |
| Magnesium | 430 L |
| Sodium | 577 |
| Chloride | 391 |
| Sulfate | 1071 |
| Carbonate | 0 |
| Bicarbonate | 172 |

TABLE 1-continued

Components of the formation water from Example 4

| Component | Concentration (mg/L) |
|---|---|
| TDS | 5600 |
| Total Hardness | 3200 |
| pH | 7.3 |

Example 5

A fracturing fluid including formation water (TDS of about 5600 mg/L, hardness of about 3200 mg/L), 25 pptg of M1 terpolymer (DP/EM 5015), and Zr crosslinker (M3) was prepared. Table 1 lists components of the formation water. In Sample 5, 1 gpt of ETHOX 3571 (about 0.1 wt. %) was added to the formation water. In Comparative Sample 5, no ETHOX 3571 was added. Viscosity of the resulting crosslinked fracturing fluids at a shear rate of 100 s$^{-1}$ was measured at 280° F. Plot 500 in FIG. 5 shows temperature versus time. Plot 502 shows viscosity versus time for Sample 5. Plot 504 shows viscosity versus time for Comparative Sample 5. For Sample 5 and Comparative Sample 5, the fluid viscosity stayed greater than about 100 cP for about 37 minutes and about 10 minutes, respectively, indicating greater increased temperature stability for Sample 5.

Example 6

A fracturing fluid including formation water (TDS of about 2210 mg/L, hardness of about 982 mg/L), 30 pptg of M1 terpolymer (DP/EM 5015), and Zr crosslinker (M3) was prepared. Table 2 lists components of the formation water. In Sample 6, 0.5 gpt of ETHOX 3571 (about 0.05 wt. %) was added to the formation water. In Comparative Sample 6, no ETHOX 3571 was added. Viscosity of the resulting crosslinked fracturing fluids at a shear rate of 100 s$^{-1}$ was measured at 300° F. Plot 600 in FIG. 6 shows temperature versus time. Plot 602 shows viscosity versus time for Sample 6. Plot 604 shows viscosity versus time for Comparative Sample 6. For Sample 6 and Comparative Sample 6, the fluid viscosity stayed greater than about 100 cP for about 110 minutes and about 54 minutes, respectively, indicating greater high temperature stability for Sample 6 (containing ETHOX 3571).

TABLE 2

Components of the formation water from Example 6

| Component | Concentration (mg/L) |
|---|---|
| Calcium | 146 |
| Iron | 2 |
| Magnesium | 150 |
| Sodium | 284 |
| Chloride | 630 |
| Sulfate | 426 |
| Bicarbonate | 324 |
| TDS | 2210 |
| Total Hardness | 982 |
| pH | 6.6 |

Definitions

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise.

Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure that is not otherwise defined, is for the purpose of description only and not of limitation. Any use of section headings is intended to aid reading of the document and is not to be interpreted as limiting. Information that is relevant to a section heading may occur within or outside of that particular section.

In the methods of manufacturing described in the present application, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used in this application can allow for a degree of variability in a value or range, for example, within 10%, within 5%, or within 1% of a stated value or of a stated limit of a range.

The term "substantially" as used in this application refers to a majority of, or mostly, as in at least about 50%, 60%, 70%, 80%, 90%, 95%, 96%, 97%, 98%, 99%, 99.5%, 99.9%, 99.99%, or at least about 99.999% or more.

As used in this application, the term "polymer" refers to a molecule having at least one repeating monomer unit and can include homopolymers, copolymers, terpolymers, and tetrapolymers. That is, "polymer" as used in this application may contain one or more different monomer units (for example, 1, 2, 3, or 4 different monomers). The term "copolymer" as used in this application refers to a polymer that includes two different repeating monomer units. In an example, a copolymer of acrylic acid an acrylamide contains two repeating units: a repeating unit of acrylic acid, and a repeating unit of acrylamide.

The term "terpolymer" as used in this application refers to a polymer that includes three different repeating monomer units. In an example, a terpolymer of acrylic acid, acrylamide, and 2-acrylamido-2-methylpropanesulfonic acid contain three repeating units: a repeating unit of acrylic acid, a repeating unit of acrylamide, and a repeating unit of 2-acrylamido-2-methylpropanesulfonic acid.

The term "derivative" as used in this application refers to a chemically modified compound, for examples, by alkylation, esterification, amination, or ethoxylation. In one example, ethoxylated derivative of a compound includes the PEGylated compound.

As used in this application, the term "fracturing fluid" refers to fluids or slurries used downhole during hydraulic fracturing operations.

As used in this application, the term "fluid" refers to gases, liquids, gels, slurries with a substantial solids content, and critical and supercritical materials. As used in this application, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact with the liquid or gaseous petroleum material. For example, a subterranean formation or material can be at least one of an area desired to be fractured, a fracture or an area surrounding a fracture, and a flow pathway or an area surrounding a flow pathway. The fracture or a flow pathway can be optionally fluidly connected to a subterranean petroleum- or water-producing region, directly or through one or more fractures or flow pathways.

As used in this application, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, water control, abandonment, and the like.

As used in this application, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore or a fracture at least one of water, a downhole fluid, or a produced hydrocarbon.

Other Embodiments

It is to be understood that while embodiments have been described in conjunction with the detailed description of such embodiments, the foregoing description is intended to illustrate and not limit the scope of this application, which is defined by the scope of the appended claims. Other aspects, advantages, and modifications are within the scope of the claims to be presented.

What is claimed is:

1. A fracturing fluid comprising a mixture of:
   an aqueous terpolymer composition comprising water and a terpolymer, the terpolymer comprising 2-acrylamido-2-methylpropanesulfonic acid (AMPS), acrylamide, and acrylic acid monomer units, or a salt thereof, wherein the terpolymer comprises 1 mol. % to 15 mol. % AMPS, wherein the fracturing fluid comprises 20 to 50 pounds of the terpolymer per thousand gallons of the fracturing fluid, and wherein the fracturing fluid comprises;
   a crosslinker comprising a metal;
   a clay stabilizer; and
   an additive comprising a sugar alcohol or a sugar alcohol derivative,
   wherein a weight ratio of the metal to the terpolymer is in a range of 0.01 to 0.16 and a concentration of the additive is in a range of 0.001 wt. % to 10 wt. % of the fracturing fluid, and wherein, after crosslinking, the fracturing fluid has a viscosity of at least 500 cP for at least 70 minutes when the gel is subjected to a shear rate of 40 s-1 at a temperature in a range of 300° F. to 400° F.

2. The fracturing fluid of claim 1, wherein the additive comprises a sugar alcohol.

3. The fracturing fluid of claim 2, wherein the sugar alcohol comprises at least one of sorbitol, erythritol, mannitol, lactitol, xylitol, and maltitol.

4. The fracturing fluid of claim 2, wherein the concentration of the sugar alcohol is in a range of 0.005 wt. % to 10 wt. % of the fracturing fluid.

5. The fracturing fluid of claim 1, wherein the additive comprises a sugar alcohol derivative.

6. The fracturing fluid of claim 5, wherein the sugar alcohol derivative comprises at least one of a derivative of sorbitol, erythritol, mannitol, lactitol, xylitol, and maltitol.

7. The fracturing fluid of claim 5, wherein the concentration of the sugar alcohol derivative is in a range of 0.05 wt. % to 2 wt. % of the fracturing fluid.

8. The fracturing fluid of claim 5, wherein the sugar alcohol derivative comprises an alkylated sugar alcohol.

9. The fracturing fluid of claim 1, wherein the weight ratio of the metal to the terpolymer is in a range of 0.02 to 0.16.

10. The fracturing fluid of claim 1, comprising at least one of a gel stabilizer, a viscosity breaker, a proppant, and a pH adjusting agent.

11. The fracturing fluid of claim 10, comprising the pH adjusting agent, wherein a pH of the fracturing fluid is in a range of 3 to 6.5.

12. The fracturing fluid of claim 1, comprising between 50 mg/L and 50,000 mg/L of total dissolved solids.

13. The fracturing fluid of claim 1, wherein a concentration of the metal in the fracturing fluid is in a range of 0.001 wt. % to 0.048 wt. %.

14. A fracturing fluid comprising a mixture of:
   a base fluid comprising water;
   an aqueous terpolymer composition comprising a terpolymer, the terpolymer comprising 2-acrylamido-2-methylpropanesulfonic acid, acrylamide, and acrylic acid monomer units, or a salt thereof, and wherein the terpolymer comprises 1 mol % to 15 mol % of the 2-acrylamido-2-methylpropanesulfonic acid monomer units and wherein the fracturing fluid comprises 20 to 50 pounds of the terpolymer per thousand gallons of the fracturing fluid;

a crosslinker comprising a metal;

a clay stabilizer; and an additive comprising a sugar alcohol or a sugar alcohol derivative, wherein a weight ratio of the metal to the terpolymer is in a range of 0.01 to 0.16, a concentration of the additive is in a range of 0.001 wt. % to 10 wt. % of the fracturing fluid, and wherein, after crosslinking, the fracturing fluid has a viscosity of at least 500 cP for at least 70 minutes when the gel is subjected to a shear rate of 40 s-1 at a temperature in a range of 300° F. to 400° F.

15. The fracturing fluid of claim 14, wherein the additive comprises a sugar alcohol.

16. The fracturing fluid of claim 15, wherein the sugar alcohol comprises at least one of sorbitol, erythritol, mannitol, lactitol, xylitol, and maltitol.

17. The fracturing fluid of claim 15, wherein the concentration of the sugar alcohol is in a range of 0.005 wt. % to 10 wt. % of the fracturing fluid.

18. The fracturing fluid of claim 15, wherein the additive comprises a sugar alcohol derivative.

19. The fracturing fluid of claim 18, wherein the sugar alcohol derivative comprises at least one of a derivative of sorbitol, erythritol, mannitol, lactitol, xylitol, and maltitol.

20. The fracturing fluid of claim 18, wherein the concentration of the sugar alcohol derivative is in a range of 0.05 wt. % to 2 wt. % of the fracturing fluid.

21. The fracturing fluid of claim 18, wherein the sugar alcohol derivative comprises an alkylated sugar alcohol.

22. The fracturing fluid of claim 14, wherein the crosslinker comprises a water-miscible, non-aqueous fluid.

* * * * *